United States Patent [19]
Kita

[11] Patent Number: 6,109,884
[45] Date of Patent: Aug. 29, 2000

[54] ROTATIONAL HYDRAULIC TRANSFORMER

[75] Inventor: Yasuo Kita, Kyoto, Japan

[73] Assignee: Hirose Valve Industry Co. Ltd., Shiga, Japan

[21] Appl. No.: 09/091,193

[22] PCT Filed: Oct. 14, 1997

[86] PCT No.: PCT/JP97/03693

§ 371 Date: Jun. 9, 1998

§ 102(e) Date: Jun. 9, 1998

[87] PCT Pub. No.: WO98/16738

PCT Pub. Date: Apr. 23, 1998

[30] Foreign Application Priority Data

Oct. 16, 1996 [JP] Japan ................................. 8-273226

[51] Int. Cl.$^7$ .............................. F04B 27/04; F04B 1/06
[52] U.S. Cl. ........................................... 417/273; 417/219
[58] Field of Search ..................................... 417/219, 273

[56] References Cited

U.S. PATENT DOCUMENTS

| 5,651,301 | 7/1997 | Thoma et al. | 91/491 |
| 5,752,427 | 5/1998 | Leutner | 91/497 |
| 6,010,311 | 1/2000 | Thoma et al. | 417/219 |

FOREIGN PATENT DOCUMENTS

| 1528610a | 10/1970 | Germany . |
| 49-124605A | 11/1974 | Japan . |
| 51-143147A | 12/1976 | Japan . |
| 5507993A | 11/1993 | Japan . |

Primary Examiner—William Doerrler
Attorney, Agent, or Firm—Price, Heneveld, Cooper, DeWitt & Litton

[57] ABSTRACT

A rotational hydraulic transformer for boosting system pressure of a hydraulic system, which is continuous, compact and has little pulsation, comprises: a first volume increasing/decreasing mechanism Y1 for cyclically and continuously increasing/decreasing the volume of a plurality of first annularly arranged spaces 8, by shifting the phase of each, by means of employing relative positional change of two relative moving members 1 and 3; a second volume increasing/decreasing mechanism Y2 for cyclically and continuously increasing/decreasing the volume of a plurality of second annularly arranged spaces, by shifting the phase of each, the second volume increasing/decreasing mechanism Y2 sharing the two relative moving members 1 and 3, and performing the increasing/decreasing by means of employing relative positional change of the two relative moving members; a pair of first channels A01 and A02, wherein one channel is connected to said first spaces of which the volume is increasing while the other channel is connected to said first spaces of which the volume is decreasing; and a pair of second channels B01 and B02, wherein one channel is connected to said second spaces of which the volume is increasing while the other channel is connected to said second spaces of which the volume is decreasing; wherein the increasing/decreasing volume of the first spaces 8 in one cycle is made to be different from that of the second spaces 9 in one cycle.

8 Claims, 8 Drawing Sheets

ROTATIONAL HYDRAULIC TRANSFORMER

BACKGROUND OF THE INVENTION

1. Technical Field

The present invention relates to a rotational hydraulic transformer capable of continuous increasing/decreasing of pressure, to be suitably used for driving concrete crushers and the like.

2. Background Art

Known arrangements for crushing concrete generally use hydraulic-driven crushers and the like which are capable of exhibiting great force. Accordingly, due to the fact that force stronger than normal is necessary for breaking steel reinforcements within the concrete when crushing steel-reinforced concrete buildings and the like, temporary increase in output is conducted by means of increasing hydraulic pressure when necessary. This is in order to maintain the system pressure low at normal times, to reduce loss of force and to improve durability of hydraulic equipment. Accordingly, such types of hydraulic equipment is provided with hydraulic mechanisms for raising the system pressure above the predetermined system pressure for supplying to an actuator. There are generally known the two following types of pressure raising methods used in such hydraulic mechanisms for raising pressure.

(A) Equipment known as a booster (intensifier) cylinder device, wherein cylinders having different effective areas ahead of and behind pistons fitted into the cylinders are used, so as to raise the hydraulic pressure connected to the side with smaller effective area than the hydraulic pressure connected to the side with greater effective area.

(B) Arrangements wherein an input shaft of a hydraulic pump and an output shaft of a hydraulic motor are mechanically linked, in which the hydraulic pressure obtained from the pump is raised above the hydraulic pressure driving the motor, by means of making the volume of the motor to be greater than the volume of the pump.

Particularly, regarding concrete crushers, booster cylinder devices based on the method described in (A) are often used to raise pressure, and examples of such include that disclosed in Japanese Unexamined Patent Publication No. 62-297508, described below in detail.

However, booster cylinder devices such as described in (A) have the problem that they are basically not suitable for continuous operation. This is because the operation of increasing pressure ends at the point that the piston reaches one of the stroke ends. In order to solve this problem, the booster cylinder device described in the aforementioned Japanese Unexamined Patent Publication No. 62-297508 has generally the following construction. Making description with reference to FIG. 11, booster chambers 02, formed to the right and left sides in FIG. 11 of a booster piston 01 for raising pressure having a large-diameter portion 011 partway thereupon, are connected via check valves provided to the outside of each of the booster chambers 02, a high pressure port OP and low pressure port OT are each connected to booster piston chambers 03 formed to the front and rear of the large-diameter portion 011 so as to be switchable by a switching valve 04, and three concave grooves 051, 052, and 053 provided to the inside face of the small radial portion of a cylinder 05 are arranged such that the groove 051 on one end is connected to high pressure P1 while the groove 053 on the other end is connected to low pressure T, and the middle groove 052 is connected to a control port 041 for the aforementioned switching valve 04, and a concave groove 012 is provided to the outside face of the small diameter portion of the booster piston 01 so as to connect the middle groove 052 to either one of the groove 051 on one end or the groove 053 on the other end, at the time that the booster piston reaches the proximity of one of the stroke ends. Incidentally, the terms "right" and "left" in the subsequent description here shall refer to that in FIG. 11.

Figure 11:
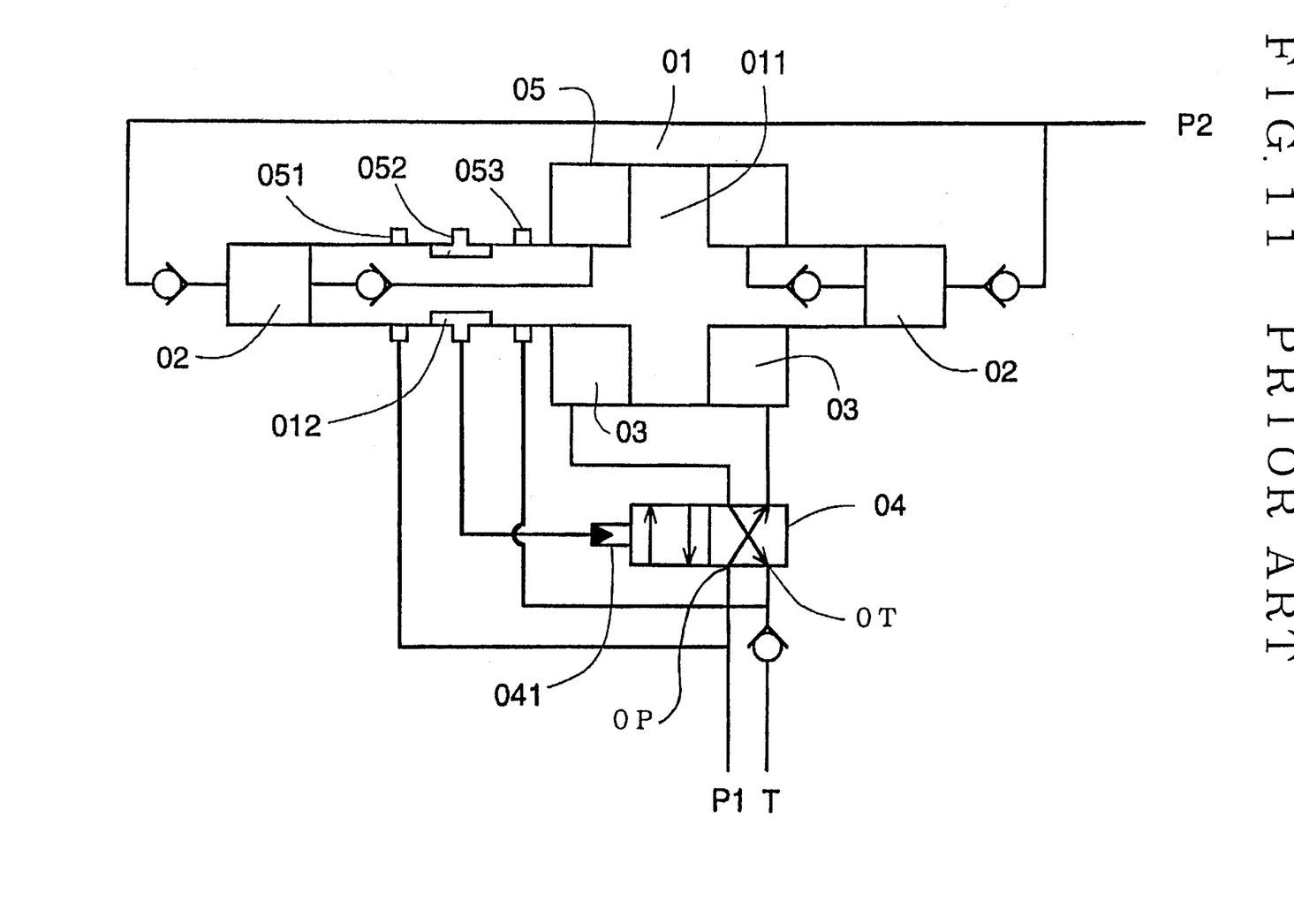
FIG. 11 is a schematic diagram illustrating prior art.

In FIG. 11, a state is shown wherein the high pressure port OP is connected to the right booster piston chamber 03 and the booster piston 01 is moving toward the left. Subsequently, at the point that the booster piston 01 reaches the proximity of the left stroke end, the middle groove 052 is connected to the groove 051 on one end, and high pressure is introduced to the switching valve control port 041. The switching valve 04 then moves to the right, such that the high pressure port OP is connected to the left booster piston chamber 03 and the low pressure port OT is connected to the right booster piston chamber 03 in the Figure, thereby the high-pressure fluid and low-pressure fluid each introduced to the right and left booster piston chambers 03 are inverted. As a result, the booster piston 01 reverses direction before reaching the stroke end and starts moving in the direction 0B. Also, the reverse operation is performed at the point that the booster piston 01 reaches the proximity of the right stroke end, and consequently, the booster piston 01 performs reciprocating motion. In other words, the pressure in the right booster chamber 02 is raised while the booster piston 01 is moving in the right direction, and the pressure in the left booster chamber 02 is raised while the booster piston 01 is moving in the left direction, so that one of the booster chambers 02 is connected with the booster port P2 via the check valve, meaning that boosting is performed unceasingly.

However, this construction has the following shortcomings. Firstly, the pressure of the booster port P2 always greatly drops at the time of reversing the direction of the booster piston 01. This is basically owing to the reciprocating motion of the piston, and this is an unavoidable phenomenon with this construction. Specifically, considering the aforementioned direction reverse of the booster piston 01, the pressure of one of the booster chambers 02, which had been subjected to raising, begins to be rapidly decompressed at the time of the direstion reverse, but the other booster chamber 02 does not immediately begin to be pressurized due to the elasticity of the fluid and the momentum of the piston 03, resulting in decrease of hydrauric pressure of the booster port P2 which should be raised.

Secondly, besides the cylinder device itself as a main body, auxiliary machines such as the switching valve 04 and many parts for piping are necessary.

Thirdly, in the event that the booster piston 01 is made to be too small, the momentum of the piston is so reduced to the extent that the booster piston 01 may stall at the time of switching. One reason thereof is that a throttle is created between the grooves 051, 052, or 053 and the concave groove 012 since the booster piston 01 moves with the slightest force, such that high pressure or low pressure is not completely connected to the control port 041, and the booster piston 01 stops at the pressure value which holds the switching valve at an intermediate position at which the force from the port booster chamber 02 and the booster piston chamber 03 are balanced. Accordingly, it is difficult to make the piston to be compact.

Next, regarding the method (B), linking two hydraulic mechanisms, namely, a pump and motor, causes difficulty in reducing the size, and the number of parts and the cost both increase. Further, piping for linking becomes necessary, complicating assembly.

In order to solve the above problems, the rotational hydraulic transformer according to the present invention relates to a hydraulic mechanism which avoids the above-described problems which are inherent to linear cylinder devices. The hydraulic mechanism of the present invention utilizes rotation but is entirely different from the conventional concept of linking two hydraulic mechanisms, namely, a pump and motor, but rather uses the differences in increasing and decreasing volume between a plurality of first annularly arranged spaces and a plurality of second annularly arranged spaces in order to completely eliminate or greatly reduce pulsation, thereby realizing continuous boosting and also reducing in size and weight.

SUMMARY OF THE INVENTION

The rotational hydraulic transformer according to the present invention comprises:

a first volume increasing/decreasing mechanism for cyclically and continuously increasing/decreasing the volume of a plurality of first annularly arranged spaces by shifting the phase of each, by employing relative positional change of two relative moving members;

a second volume increasing/decreasing mechanism for cyclically and continuously increasing/decreasing the volume of a plurality of second annularly arranged spaces by shifting the phase of each, wherein the second volume increasing/decreasing mechanism shares the two relative moving members in common, and cyclically and continuously increasing/decreasing the volume of the second spaces by employing relative positional change of the two relative moving members;

a pair of first channels, wherein one of the first channels is connected to the first spaces of which the volume is increasing while the other first channel is connected to the first spaces of which the volume is decreasing; and a pair of second channels, wherein one of the second channels is connected to the second spaces of which the volume is increasing while the other second channel is connected to the second spaces of which the volume is decreasing;

wherein an increasing/decreasing volume of the first spaces and an increasing/decreasing volume of the second spaces in one cycle are made to be different.

According to the above-described configuration, continuous boosting or decompression of pressure is made possible, and the pressure thereof becomes stable.

In order to reduce the above configuration in size, it is preferable that the first volume increasing/decreasing mechanism comprises: a ring-shaped casing which constitutes one of relative moving members and which is rotatably supported as to a first axial line which is the center axial line thereof; a cylinder block which constitutes the other relative moving member and which is rotatably supported as to a second axial line which is offset from the first axial line in a parallel manner; a synchronizing mechanism which synchronizes the rotational speed of the cylinder block with the rotational speed of the casing; a plurality of first cylinders of the same diameter formed in the cylinder block in a manner radial to the second axial line; and first pistons slidably fitted into each of the cylinders with the leading end planes thereof coming into contact with the inner circumference of the casing; thereby enabling cyclically and continuously increasing/decreasing the volume of spaces within the first cylinders, the spaces constituting the first spaces formed at the base side of the first pistons with rotation of the cylinder block, by shifting the phase of each; and the second volume increasing/decreasing mechanism which shares the casing and cylinder block in common with the first volume increasing/decreasing mechanism, and comprises: a plurality of second cylinders of the same diameter formed in the cylinder block in a manner radial to the second axial line and so as not to overlap the first cylinders; and second pistons slidably fitted into each of the second cylinders with the leading end planes thereof coming into contact with the inner circumference of the casing; thereby enabling cyclically and continuously increasing/decreasing the volume of spaces within the second cylinders, the spaces constituting the second spaces formed at the base side of the second pistons with rotation of the cylinder block, by shifting the phase of each.

In addition to the above advantages, in order to constantly balance the component members of the rotational hydraulic transformer according to the present invention, and to further reduce size and weight by not adding bearings or other parts unnecessarily, it is desirable to have an arrangement wherein an odd number of the first cylinders are evenly spaced upon a plane perpendicular to the second axial line, and wherein the second cylinders are spaced upon the same plane as the plane upon which the first cylinders are arranged, in a manner symmetrical to the first cylinders.

An arrangement is desirable wherein the leading end planes of the first and second pistons are flat planes perpendicular to the direction of protruding and inserting, wherein the inner circumference of the casing is comprised of a plurality of flat planes capable of slidably coming into tight contact with each of the leading end planes of these pistons, since prying force is not placed upon the piston, so the piston slides smoothly, and fabricating of the pistons and inner circumference of the casing is also easy.

Regarding a mechanism for causing the cylinder block to orbit around the casing, an arrangement desirable owing to simplicity in structure is such wherein the casing is axially supported by a shaft which is centered upon the first axial line, and the cylinder block is axially supported by an eccentric member provided partway along the shaft and is centered upon the second axial line.

Further, a desirable specific arrangement of the synchronizing mechanism comprises: a plurality of pins protruding from one end plane which is perpendicular to the second axial line of the cylinder block, and a plurality of recesses having a circular cross-sectional form provided to the inner face of a cover which is the member of the casing which slidably comes into contact with both ends of the cylinder block, wherein the recesses have a radius which is equal to the sum of the offset and the radius of the pins, and wherein these recesses are provided at positions corresponding with the pins so as to engage these pins.

Further, an arrangement wherein the first and second pistons are provided with pressure pockets at the leading end planes thereof and connected hydraulically with the base planes (disclosed in Japanese Patent Publication No. 51-22644) is suitable in order to form static pressure bearings at the sliding portion between the leading end planes of the pistons and the inner circumference of the casing to suppress abrasion or seizure due to sliding motion, thereby extending life expectancy of the parts without increasing the number of parts.

Also, in order to form the first and second channels efficiently and facilitate connection with an external hydraulic circuit, it is preferable that each of the pair of first channels has one end opening to portions opposing the eccentric member outer circumference and the other end opening to the tip plane of the shaft, and each of the pair of second channels has one end opening to portions opposing the eccentric member outer circumference and the other end opening to the tip plane of the shaft.

DETAILED DESCRIPTION OF THE PREFERRED EMBODIMENT

An embodiment of the present invention will be described with reference to the drawings.

The rotational hydraulic transformer 0 according to the present invention is comprised of a first volume increasing/decreasing mechanism Y1, a second volume increasing/decreasing mechanism Y2, a pair of first channels A01 and A02, and a pair of second channels B01 and B02. Describing the construction thereof with reference to FIGS. 1 through 5, the first volume increasing/decreasing mechanism Y1 is comprised of a ring-shaped casing 1 supported by a shaft 2, a cylinder block 3, first cylinders 4 formed in the cylinder block 3, and first pistons 6 fitted into each of the first cylinders 4 in a protruding and inserting manner, whereby the spaces within the first cylinders 4 which constitute the first spaces 8 are increased or decreased in volume by the protruding and inserting of the first pistons 6. Also, the second volume increasing/decreasing mechanism Y2 shares the casing 1 and cylinder block 3 in common with the first volume increasing/decreasing mechanism Y1, and comprises second cylinders 5 formed in the cylinder block 3 so as not to overlap the first cylinders 4, and second pistons 7 fitted into each of the second cylinders 5 in a protruding and inserting manner, whereby the spaces within the second cylinders 5 which constitute the second spaces 9 are increased or decreased by the protruding and inserting of the second pistons 7. Also, the first channels A01 and A02 are each connected to the first spaces 8, and the second channels B01 and B02 are each connected to the second spaces 9.

Figure 1:
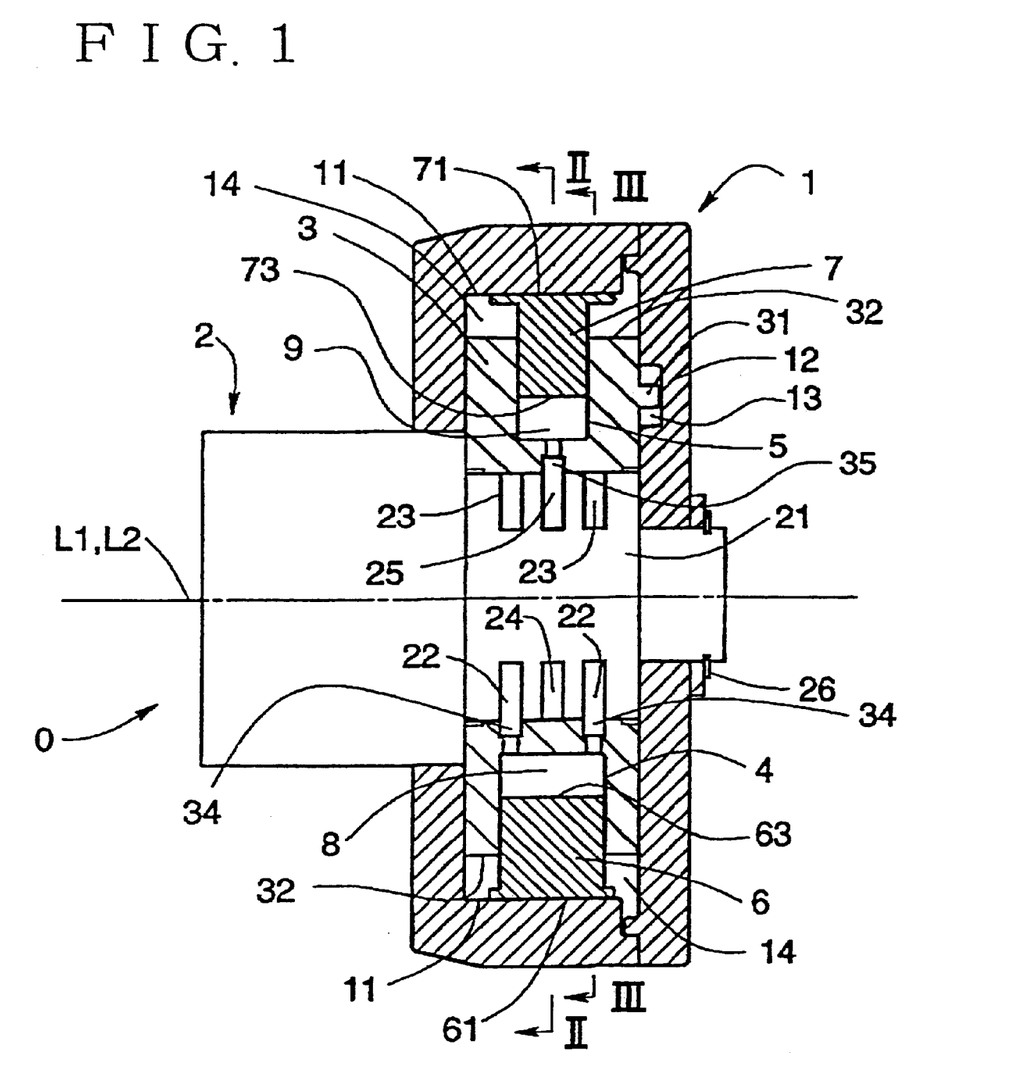
FIG. 1 is a longitudinal cross-sectional view (cross-section view taken along line I—I in FIG. 2) of a rotational hydraulic transformer according to an embodiment of the present invention.

Describing each part in detail, the shaft 2 has the center line thereof as a first axial line L1, supporting the casing 1 so as to be rotatable forwards and reverse around the first axial line L1, and makes the casing 1 to be immovable in the direction along this axial line L1 by fitting a C-ring 26 to one end thereof. The eccentric member 21 is provided partway along the shaft 2, and the cylinder block 3 is fitted rotatable in the forwards and reverse direction to the outer circumference of this eccentric member 21. Also, the center line of this eccentric member 21 matches a second axial line L2, and the aforementioned first axial line L1 and second axial line L2 are parallel lines maintaining an offset "a".

The casing 1 has a cover 12 which makes the cylinder block 3 to be immovable in the direction along the first axial line L1 and also seals the interior space 14. The cross-section of this interior space 14 is a regular decagon. Also, five recesses 13 are provided at the inner end plane of the cover, which are evenly spaced in the peripheral direction centered around the first axial line L1, with the opening form of these recesses 13 being circular and of a radius which is equal to the sum of the aforementioned offset "a" and the radius of latter-described pins 31.

Figure 2:
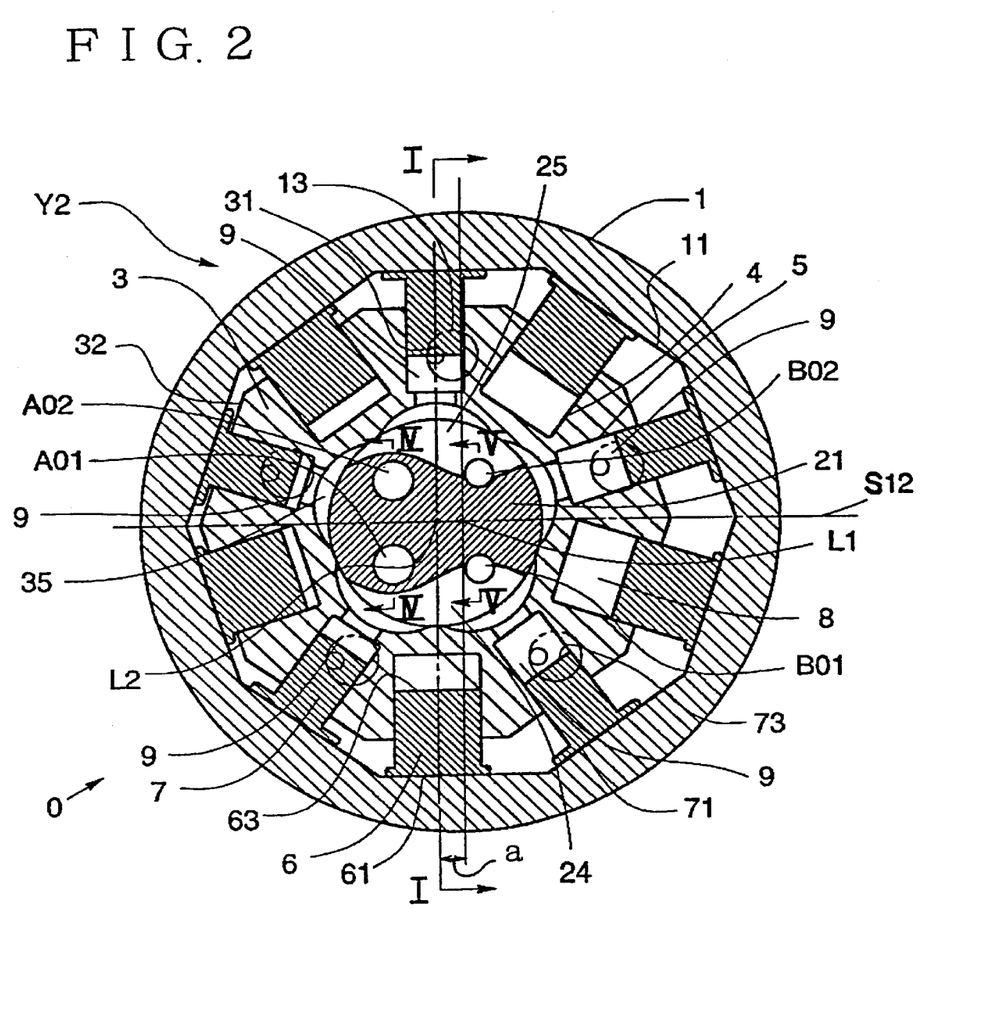
FIG. 2 is a cross-sectional view taken along line II—II in FIG. 1.
Figure 3:
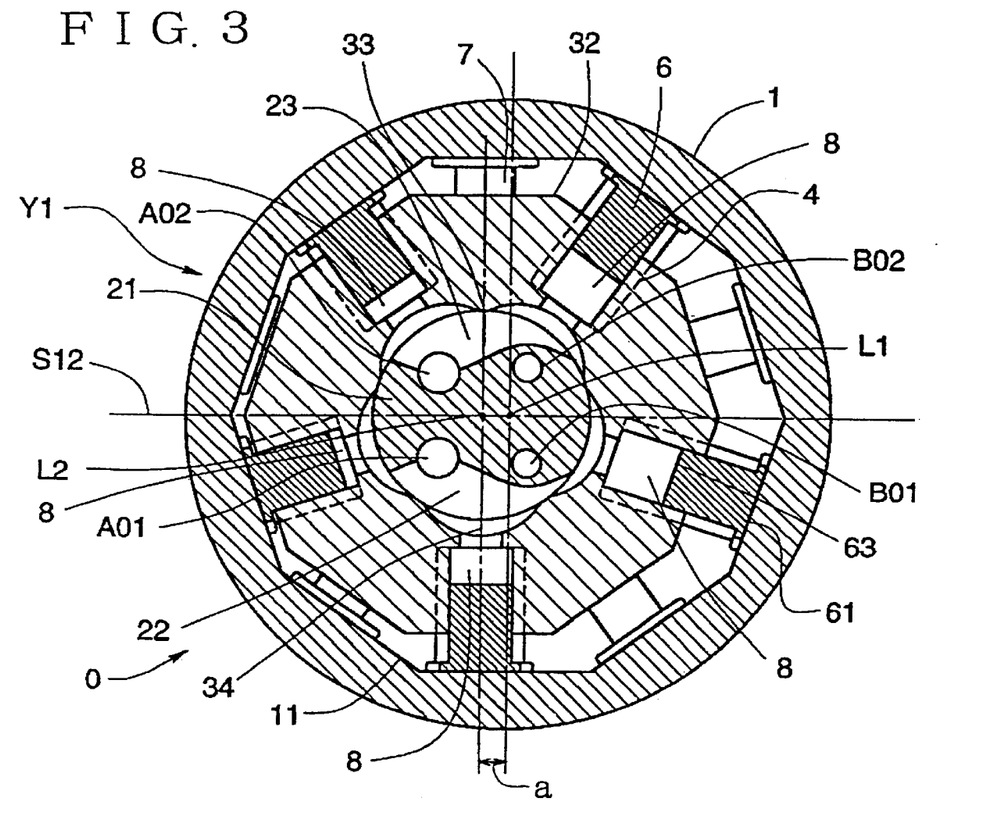
FIG. 3 is a cross-sectional view taken along line III—III in FIG. 1.

The cylinder block 3 has a through hole with the eccentric member 21 fitted in the center thereof, and further has five first cylinders 4 formed radially toward the second axial line L2 so as to open toward the outer circumference 32 of the cylinder block 3. Also, second cylinders 5 are formed at positions opposing to each of the first cylinders 4 formed in the cylinder block 3, the second cylinders 5 being formed such that the axial center thereof agrees with that of the first cylinders 4. In other words, the axial centers of the mutually corresponding first cylinders 4 and second cylinders 5 are set to pass through the aforementioned second axial line L2, and the first cylinders 4 and second cylinders 5 are arrayed along a common plane which is orthogonal to the second axial line L2. The interior diameters of the first cylinders 4 and second cylinders 5 are made to be different, and in the present embodiment, the diameter of the first cylinders 4 is made to be greater. Further, the cylinder block 3 is of the form of a regular decagon cylinder, and the opening portions of the first cylinders 4 and the second cylinders 5 are provided at the center of each of the ten sides of the regular decagon cylinder. As to the present embodiment, the five first cylinders 4 and the five second cylinders 5 are alternately provided so as to open in the peripheral direction on the outer circumferential face 32 of the cylinder block 3. Also, five pins 31 are erected at the portions corresponding to the aforementioned recesses 13, with each fitted into the recesses 13, thereby comprising a synchronizing mechanism which causes the cylinder block 3 and the casing 1 to rotate in the same direction at the same rotational speed.

The first and second pistons 6 and 7 are of round cylindrical forms which have flat leading end planes 61 and 71 respectively. Each of the first pistons 6 is fitted into each of the first cylinders 4 and each of the second pistons 7 is fitted into each of the second cylinders 5 in a protruding and inserting manner with the leading end planes 61 and 71 thereof slidably coming into contact with the face corresponding with one side face of the regular decagon of the inner circumference 11 of the casing 1.

The first spaces 8 are formed between the base plane 63 of the aforementioned first pistons 6 and the first cylinders 4, the volume thereof increasing or decreasing by the first pistons 6 protruding and inserting in the first cylinders 4. The first spaces 8 in one side which is sectioned off by an imaginal plane S12 formed by the first axial line L1 and second axial line L2 become the volume increasing spaces 81 (spaces wherein the volume is in the process of increasing) in accordance with rotation of the casing 1 and cylinder block 3 in either the forward or reverse direction, and the first spaces 8 in the other side which is sectioned off by the imaginal plane S12 become the volume decreasing spaces 82 (spaces wherein the volume is in the process of decreasing).

In the same manner as described above, the second spaces 9 are formed between the base plane 73 of the aforementioned second pistons 7 and the second cylinders 5, the volume thereof increasing or decreasing by the second pistons 7 protruding and inserting in the second cylinders 5. The second spaces 9 in one side which is sectioned off by an imaginal plane S12 formed by the first axial line L1 and second axial line L2 become the volume increasing spaces 91 (spaces wherein the volume is in the process of increasing) in accordance with rotation of the casing 1 and cylinder block 3 in either the forward or reverse direction, and the second spaces 9 in the other side which is sectioned off by the imaginal plane S12 become the volume decreasing spaces 92 (spaces wherein the volume is in the process of decreasing).

Figure 4:
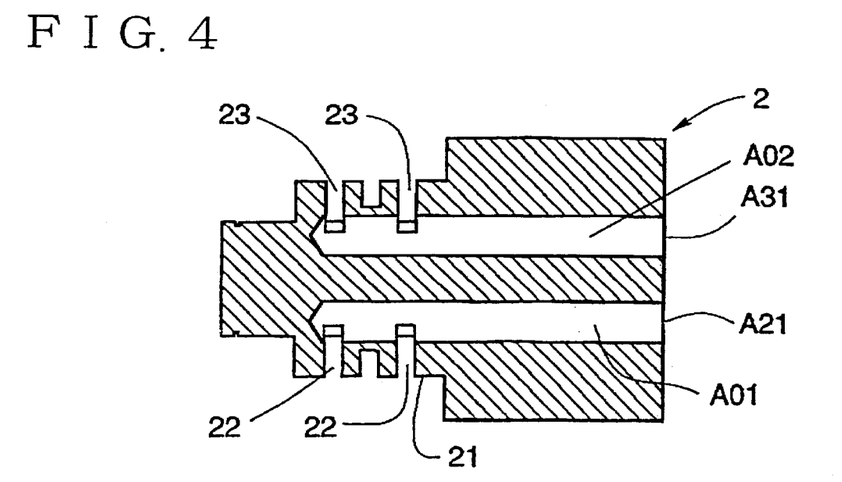
FIG. 4 is a cross-sectional view of the axis 2 taken along line IV—IV in FIG. 2.

As shown in FIG. 3 and FIG. 4, one first channel A01 has one end opening to a pair of axial grooves 22 recessed in the outer circumference of the eccentric member 21 and the other end A21 opening to the tip plane of the shaft, and the other first channel A02 has one end opening to a pair of axial grooves 23 recessed in the outer circumference of the eccentric member 21 and the other end A31 opening to the tip plane of the shaft. The base planes of the first cylinders 4 are opened to portions at which connection can be made with the aforementioned axial grooves 22 and 23 on the inner circumferential face 33 of the cylinder block, and hence the first channels A01 and A02 connect the volume increasing spaces 81 and the volume decreasing spaces 82 respectively with fluid introducing ports A21 and A31 for introducing fluid in and out. This will be described in detail. Each base plane of the first cylinders 4 is respectively connected with the five pairs of openings 34 recessed on the inner circumferential face 33 of the cylinder block. These openings 34 are provided in a pair with a first cylinder 4 in the direction of the second axial line L2, and the five pairs of openings 34 connecting in a manner corresponding with each of the five first cylinders 4 are recessed on the inner circumferential face 33 of the cylinder block 3, so as not to overlap. Also, the axial grooves 22 and 23 are each provided as a pair in the direction of the second axial line L2 so as to be connectable with the openings 34. The positional relation of the axial grooves 22 and 23 is such which is symmetrical as to an imaginal plane S12 formed by the first axial line L1 and second axial line L2, and the circumferential length of the axial portion where there is no groove between the grooves 22 and 23 is made to be longer than the circumferential length of the portions of the openings 34 which come into contact with the shaft 2, so that the axial grooves 22 and 23 are not connected via the openings 34 regardless of the positional relation of the shaft 2 and the cylinder block 3.

Figure 5:
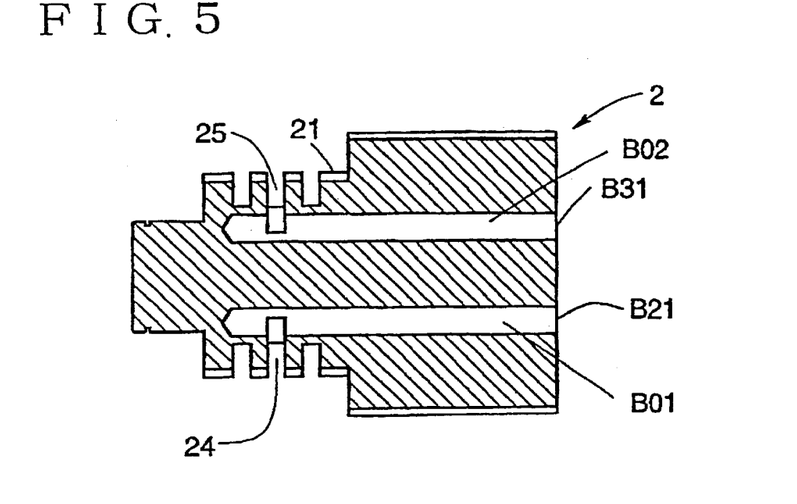
FIG. 5 is a cross-sectional view of the axis 2 taken along line V—V in FIG. 2.

As shown in FIG. 2 and FIG. 5, one second channel B01 has one end opening to an axial groove 24 recessed in the outer circumference of the eccentric member 21 and the other end B21 opening to the tip plane of the shaft, and the other second channel B02 has one end opening to an axial groove 25 recessed in the outer circumference of the eccentric member 21 and the other end B31 opening to the tip plane of the shaft. The base planes of the second cylinder 5 are opened to portions corresponding with the aforementioned axial grooves 24 and 25 on the inner circumferential face 33 of the cylinder block, and hence the second channels B01 and B02 connect the volume increasing spaces 91 and the volume decreasing space 92 respectively with fluid introducing ports B21 and B31 for introducing fluid in and out. This will be described in detail. Each base plane of the second cylinders 5 is respectively connected with the five pairs of openings 35 recessed on the inner circumferential face 33 of the cylinder block. These openings 35 are provided at intermediate positions between the aforementioned pair of openings 34, and the five pairs of openings 35 connecting in a manner that corresponding with each of the five second cylinders 4 are recessed on the inner circumferential face 33 of the cylinder block 3, so as not to overlap. Also, the axial grooves 24 and 25 are each provided between the aforementioned pair of axial grooves 22 and pair of axial grooves 23 so as to be connectable with the openings 35. The positional relation of the axial grooves 24 and 25 is such that is symmetrical as to an imaginal plane S12 formed by the first axial line L1 and second axial line L2, and the circumferential length of the axial portion where there is no groove between the grooves 24 and 25 is made to be longer than the circumferential length of the portions of the openings 35 which come into contact with the shaft 2, so that the grooves 24 and 25 are not connected via the openings 35 regardless of the positional relation of the shaft 2 and the cylinder block 3.

An example of operation of the present embodiment constructed as such will be described with reference to FIG. 6 through FIG. 10.

Figure 10:
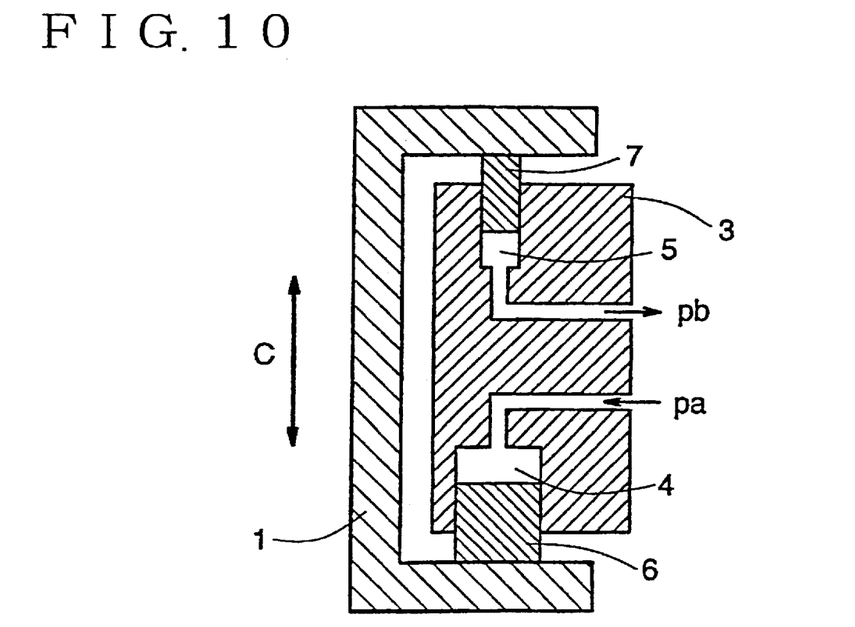
FIG. 10 is a diagram describing the operational concept of the present embodiment.

First, before describing the operation of the present embodiment, the operational concept thereof shall be described with reference to FIG. 10. That is, the hydraulic transformer according to the present conceptual diagram is comprised of pistons 6 and 7 which are capable of protruding opposingly to each other and respectively having a radius (Da) and a radius (Db), cylinders 4 and 5 which support the pistons 6 and 7 in a protruding and inserting manner, a cylinder block 3 which forms the cylinders 4 and 5, and a casing 1 having the internal face which comes into contact with the leading end planes of the pistons 6 and 7 and the casing 1 is slidable in the protruding and inserting direction C of the pistons 6 and 7.

With such a configuration, applying a primary hydraulic pressure (pa) to the cylinders 4 converts the protruding force of the pistons 6 into sliding force of the casing 1 and is transmitted to the pistons 7, and is obtained as a secondary hydraulic pressure (pb). However, since the operation ends when the pistons 6 and 7 reach the stroke ends with such an arrangement, the present embodiment is arranged such that the pistons 6 and 7, and the cylinders 4 and 5 are arrayed in a ring with the casing 1 which is also a ring-shaped form, and the center axis of the casing 1 and the center axis of the cylinder block 3 are formed eccentric from each other, thereby enabling the aforementioned sliding force to be obtained as rotating force and the rotational hydraulic transformer can be made to operate continuously. Also, as can be clearly understood from FIG. 10, hydraulic pressure (pb) is generated at the secondary side even if the secondary side port is closed. That is to say, in the subsequent description of operation, the rotation of the casing 1 will be described, but even in the event that the secondary side port is closed and the rotation of the casing 1 is stopped in order not to obtain the output, hydraulic pressure is constantly generated at the secondary side, and hence the present embodiment has in fact functionality the same as that of an electric transformer, but carried out in a hydraulic system.

Figure 6:
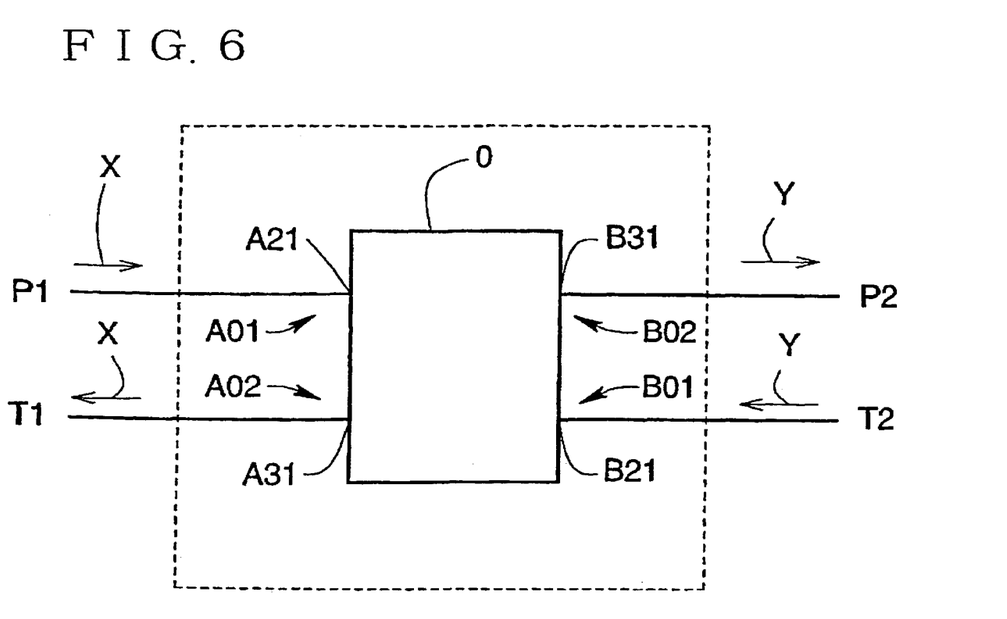
FIG. 6 is a diagram illustrating an example of a hydraulic circuit including the rotational hydraulic transformer according to the present embodiment.

Next, regarding detailed description of the operation of the present embodiment, description will be made on the assumption that the shaft 2 is fixed. In order to operate the rotational hydraulic transformer 0 according to the present invention, the primary side port P1 which is the input is connected to one of the first channel A01, and A21 is made to be a fluid introduction port. Also, the tank port T1 is connected to the other first channel A02, and A31 is made to be a fluid outflow port. Accordingly, the fluid on the primary side flows in the direction of the arrow X. The secondary side port P2 which is the output is connected to one of the second channel B02. Also, the tank port T2 is connected to the other second channel B01. As a result, B21 is made to be a fluid introduction port, and B31 is made to be a fluid outflow port. Accordingly, the fluid on the secondary side flows in the direction of the arrow Y. The hydraulic pressure of the ports P1 and T1 are respectively pa1 and pa2 at this time and the pressure difference thereof is (pa) while the hydraulic pressure of the ports P2 and T2 are respectively pb1 and pb2 and the pressure difference thereof is (pb).

Figure 7:
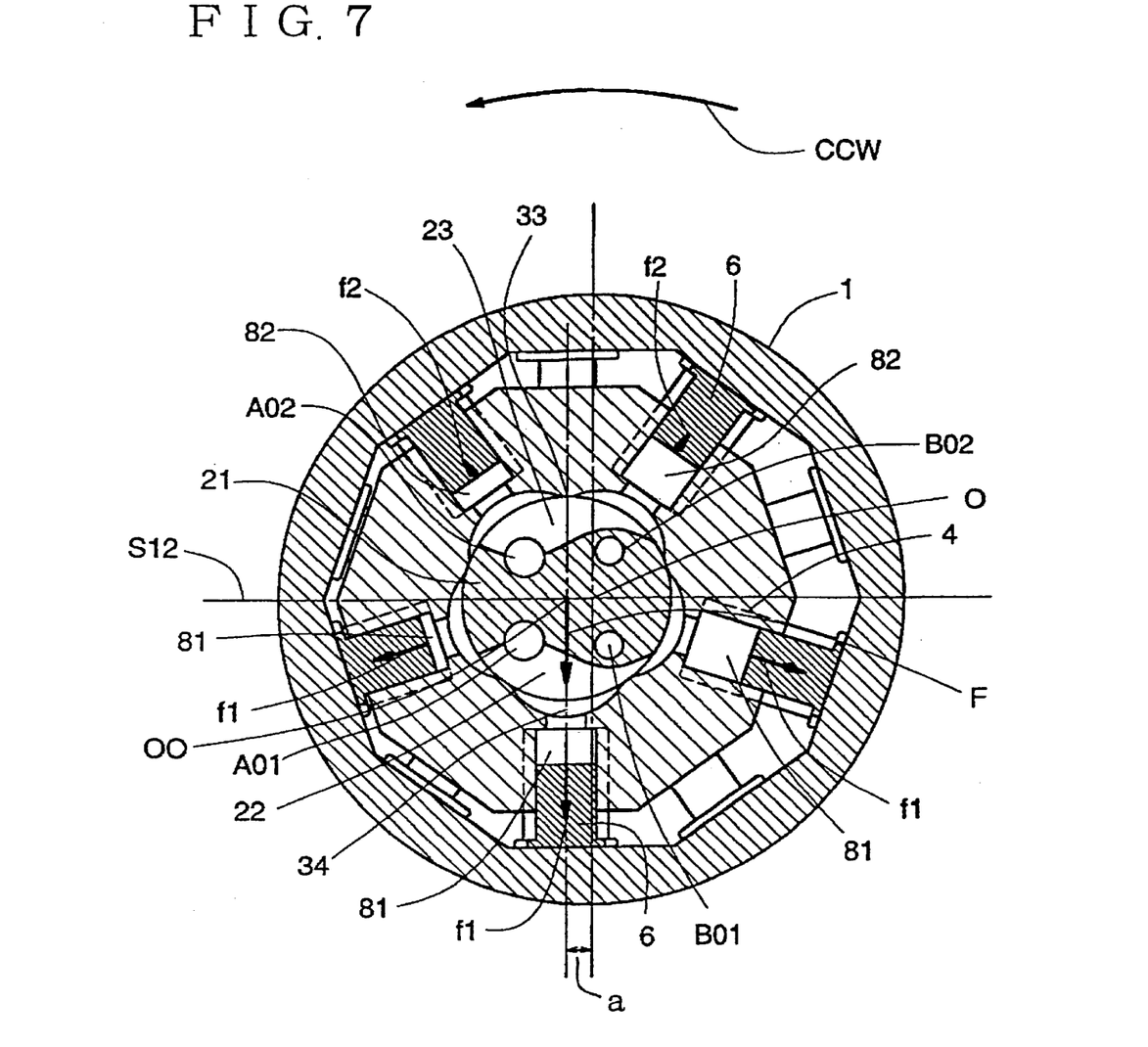
FIG. 7 is a diagram describing the operational principle.

With FIG. 7 as the initial state of the present embodiment, as described above, the fluid introduced from the primary port P1 at the pressure pa1 fills the three first cylinders 4 existing toward the lower part of the page of the space sectioned off by an imaginal plane S12, via the openings 34 passing through the lower part of the page of the space sectioned off by the imaginal plane S12, and hence force f1 is applied to the first pistons 6 fitted into the first cylinders 4 in the protruding directions thereof. In the meantime, the other first cylinders 4 are connected from the other first channel A02 to the tank port T1, via the openings 34 passing through the upper part of the page of the space sectioned off by the imaginal plane S12. Consequently, the other first cylinders 4 are filled with the fluid with the pressure pa2, and hence force f2 is applied to the first pistons 6 fitted into the first cylinders 4 in the protruding directions thereof. The force placed upon the casing 1 in this state is the combined force placed on all first pistons 6, which is the vector F shown in FIG. 7. The intensity |F| of the vector F is expressed by the expression:

$$|F|=(\pi/2)\cdot\cos(\pi/5)\cdot(Da)^2\cdot pa \quad (1)$$

wherein Da represents the inner diameter of the first cylinder 4.

Since the aforementioned force vector F operates on the position 00 (the point shown in the paper on the second axial line L2), which is eccentric by an amount of "a" from the rotational center 0 (the point shown in the paper on the first axial line L1) of the casing 1, as shown in FIG. 7, rotational force (F·a) operates upon the casing 1, and this rotational force causes the casing 1 to rotate in a counter-clockwise direction (direction CCW in FIGS. 7 and 8) centrally around 0. Accompanying the rotation of this casing 1, the cylinder block 3 also rotates in the same direction at the same speed centrally around 00, owing to the synchronizing mechanism comprised of the movable fitting of the pins 31 into recesses 13. Then, the space within the cylinders 4 passing through the lower part of the page of the space sectioned off by the imaginal plane S12 becomes the volume increasing spaces 81, and the space within the remaining cylinders 4 becomes the volume decreasing spaces 82. At this time, each of the first pistons 6 are pressed against the inner circumference plane 11 of the casing 1 by the fluid pressure within the first cylinders 4, and slide over the inner circumferential plane 11 of the casing 1 while continuously protruding and inserting according to the same-speed synchronized rotational movement of the cylinder block 3 and the casing 1.

Figure 8:
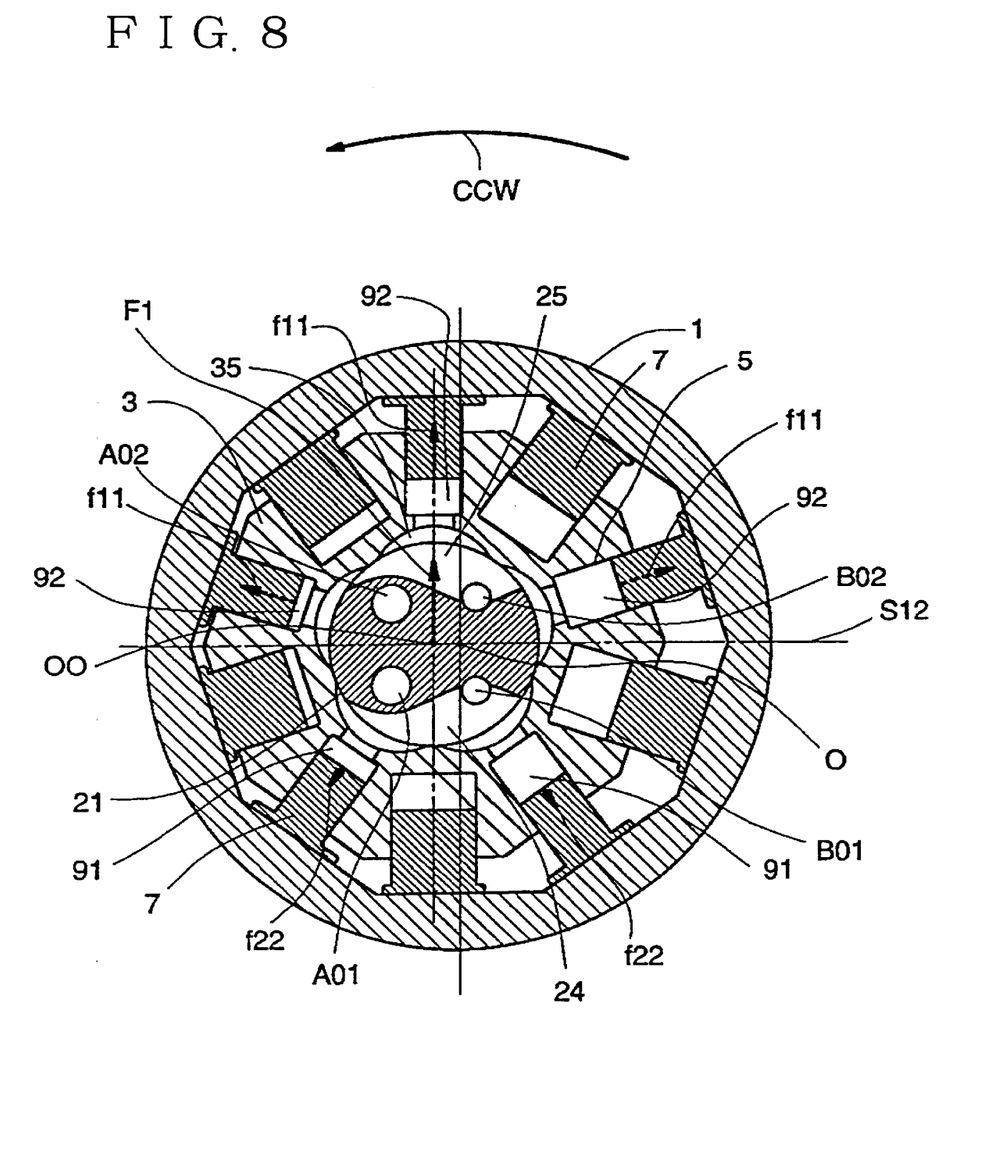
FIG. 8 is a diagram describing the operational principle.

Next, each of the second pistons 7 perform protruding and inserting conversely by means of the same-speed synchronized rotational movement of the cylinder block 3 and the casing 1. Specifically, as shown in FIG. 8 which illustrates the state of the second pistons 7 and cylinder block 3 corresponding with the state shown in FIG. 7, the secondary side tank port T2 is connected to the volume increasing spaces 91, via the openings 35 passing through the lower part of the page of the space sectioned off by the imaginal plane S12. In other words, the two other second cylinders 5 existing in the lower part of the page of the space sectioned off by the imaginal plane S12 are filled with the fluid with the pressure pb2.

In the event that the casing 1 rotates from this state, at the point that the fluid sealed within the aforementioned two cylinders passes through the imaginal plane S12 due to the rotation and enter into the upper part of the page of the space, the fluid is discharged from the axial groove 24 by the second pistons 7 at the fluid pressure pb1 corresponding with the aforementioned rotational force. The fluid of which the pressure has been raised by the rotational force is discharged from the secondary side port P2 via the other second channel B02. The increase in fluid pressure (pb) is proportionate to the aforementioned rotational force, and inversely proportional to Db to the second power, Db being the inner diameter of the second cylinder 5, that is, $$pb=F/((\pi/2)\cdot\cos(\pi/5))/(Db)^2 \quad (2)$$

Overall, it can be understood that the relation between the primary side pressure difference (pa) and the secondary side pressure difference (pb) is reverse to the ratio of the inner diameter of the first cylinder squared and the inner diameter of the second cylinder squared, as expressed in the following expression:

$$pa/pb=(Db)^2/(Da)^2 \quad (3)$$

Further, in terms of the superordinate concept, the relation between the primary side pressure difference (pa) and the secondary side pressure difference (pb) is the inverse ratio of the increasing/decreasing volume of the first spaces 8 and the increasing/decreasing volume of the second spaces 9 within one cycle. In other words, the primary side pressure difference (pa) can be increased and made to be the secondary side pressure difference (pb) by means of making the increasing/decreasing volume of the first spaces 8 to be greater than the increasing/decreasing volume of the second spaces 9.

Thus, according to the present embodiment, the fluid pressure introduced to the first space 8 is changed into the rotational force of the casing 1 via the increasing/decreasing volume of the first spaces 8 by means of protruding and inserting of the first pistons 6, and further the second pistons 7 are caused to perform protruding and inserting by the rotational force, which is converted into the increasing/decreasing volume of the second spaces 9, i.e., continuous intake and discharge of fluid. Accordingly, continuous boosting can be performed, and a high-quality rotational hydraulic transformer serving as a constant pressure source without pulsation, with extremely stable output pressure or discharge flow can be provided, which is not obtainable with a linear cylinder device. Also, since the above operation increases and decreases the pressure difference between the first channels A01 and A02, thereby making this pressure difference to be the pressure difference between the second channels B01 and B02 as shown in the Expression (3), in the case of boosting pressure, for example, connecting the lower pressure side B01 of the second channel to the higher pressure side A01 of the first channel allows raising the pressure pb1 of the secondary side high-pressure port P2 above the ratio of the squared inner diameters of the first cylinders 4 and 5, as expressed by $$pb1 = pa1 \cdot (1 + (Da)^2/(Db)^2) \tag{4}$$

Thus high pressure unobtainable with a linear cylinder device can be obtained. Also, owing to the construction of the present embodiment, it is possible to fluidally separate the first channels A01 and A02 from the second channels B01 and B02 completely.

Further, according to the present embodiment, the following effects can be obtained as well. That is, the rotational force is operating on the casing, but the radial force is also operating there upon at the same time. However, since the second cylinders 5 are formed symmetrically to 00 on the same plane as the formation plane of the first cylinders 4, so the combined force F1 of the protruding forces f11 and f22 of the second cylinders 5 due to the secondary side fluid pressure is generated exactly opposite to the radial force F due to the primary side fluid pressure, thereby the radial force on the casing 1 is balanced. As a result, an innovative effect is achieved in which no rotational bearings are needed for axially supporting the casing 1. Specifically, this greatly contributes to reduction in the number of parts, reduction in the steps for assembly, reduction in size and weight of the device, increase of the endurance of the device, and so forth.

Figure 9:
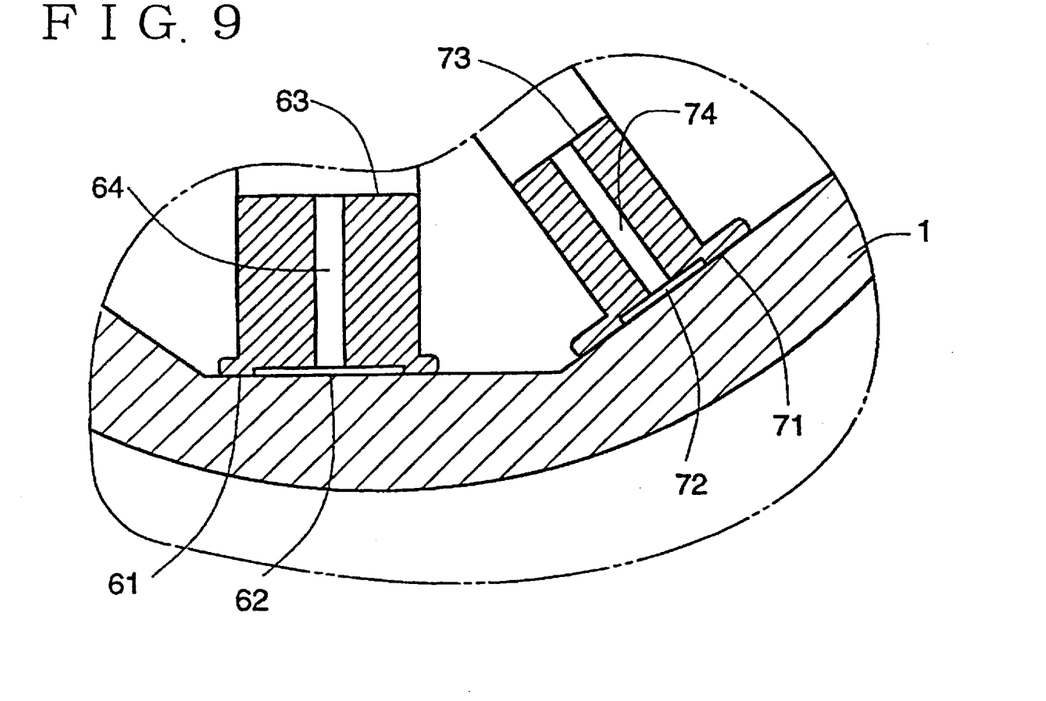
FIG. 9 is a cross-section view of an alteration of the piston.

Further, as shown in FIG. 9, it is possible to make an arrangement wherein the first pistons 6 and the second pistons 7 are provided with pressure pockets 62 and 72 recessed at the leading end planes 61 and 71 thereof and these are communicated with the piston base planes 63 and 73 via through holes 64 and 74 for guiding fluid to the pressure pockets 62 and 72, thereby forming static pressure bearings at the aforementioned sliding portion in order to diminish the abrasion at the sliding portion without increasing the number of parts.

Although the above description has been made on the assumption that the shaft 2 is fixed, but since the present embodiment operates by relative movement of the shaft 2 and the casing 1, it is needless to say that the casing 1 may be fixed and the shaft 2 rotated.

Incidentally, the present invention is by no means restricted to the above-described embodiment. As an example, in order to reduce the outer diameter of the present embodiment, the plane on which the first cylinders are formed and the plane on which the second cylinders are formed may be made to be differing planes, these being arrayed in the axial direction. In this case, radial force operates on the casing, so rotational bearings are necessary between the shaft and casing, but this does not affect the capabilities as a continuous boosting and decompressing mechanism, and it is effective if the restrictions to the magnitude in the axial direction are loose. Also, the number of cylinders are not restricted to the number described above. Further, the present embodiment has been described on the assumption of boosting with Da>Db, but it is also possible to reverse it and use the device for decompression.

Further, the construction of the various components are not restricted to the example illustrated in the drawings; rather, various alterations may be made within a range not departing from the scope and spirit of the present invention.

Industrial Applicability

According to the rotational hydraulic transformer of the present invention, the difference between the increasing/decreasing volume of a plurality of first spaces arrayed in a ring and the increasing/decreasing volume of a plurality of second spaces is used to continuously raise pressure or lower pressure with little or no pulsation, and it can be used as a high-quality hydraulic pressure source. Also, the pressure difference between the first channels is increased or decreased and is used as the pressure difference between the second channels, so the first channels and second channels can be separated, thereby enabling the same operation as the transformer in an electrical circuit, and hence provide new usages for all hydraulic devices, not only such for driving as for concrete crushers.

Reducing the size of the first volume increasing/decreasing mechanism and the second volume increasing/decreasing mechanism synchronized thereto, and reducing the number of parts thereof, can be realized by the first volume increasing/decreasing mechanism comprising:

a ring-shaped casing which is one of the relative moving members and which is rotatably supported as to a first axial line which is the center axial line thereof; a cylinder block which is the other relative moving member and which is rotatably supported as to a second axial line which is offset from the first axial line in a parallel manner; a synchronizing mechanism which synchronizes the rotational speed of the cylinder block and the casing so that the rotational speeds thereof are the same; a plurality of first cylinders of the same diameter formed in the cylinder block in a manner radial to the second axial line; and first pistons fitted into each of the cylinders in a protruding and inserting manner with the leading end planes thereof coming into contact with the inner circumferential face of the casing; thereby enabling cyclically and continuously increasing/decreasing the volume of spaces within the first cylinders which constitute the first spaces formed at the base side of the first pistons with rotation of the cylinder block, by shifting the phase of each; and the second volume increasing/decreasing mechanism sharing the casing and cylinder block with the first volume increasing/decreasing mechanism, and comprising:

a plurality of second cylinders of the same diameter formed in the cylinder block in a manner radial to the second axial line, so as not to overlap the first cylinders; and second pistons fitted into each of the second cylinders in a protruding and inserting manner with the leading end planes thereof coming into contact with the inner circumferential face of the casing; thereby enabling cyclically and continuously increasing/decreasing the volume of spaces within the second cylinders which constitute the second spaces formed at the base side of the second pistons with rotation of the cylinder block, by shifting the phase of each.

Also, in addition to the above advantages, the shaft and cylinder block which are the rotation component members of the rotational hydraulic transformer according to the present invention can be constantly balanced, thereby it becomes avoidable to add bearings or other parts unnecessarily for supporting these members and it contributes to reduction in the number of parts, reduction in the steps for assembly, reduction in size and weight of the device, increase of the endurance of the device, and so forth, by making an arrangement wherein an odd number of the first cylinders are evenly spaced upon a plane perpendicular to the second axial line, and the second cylinders are spaced upon the same plane as the plane upon which the first cylinders are arrayed, in a manner symmetrical to the first cylinders.

Also, an arrangement wherein the leading end planes of the first and second pistons are flat planes perpendicular to the direction of protruding and inserting, and wherein the inner circumferential face of the casing is comprised of a plurality of flat planes capable of slidably coming into tight contact with each of the leading end planes of these pistons, allows the piston to slide smoothly since prying force is not placed upon the pistons, and fabricating the pistons and inner circumferential face of the casing becomes easy.

An arrangement wherein the casing is axially supported by a shaft which is centered upon the first axial line, and the cylinder block is axially supported by an eccentric member provided partway along the shaft and is centered upon the second axial line, simplifies construction.

Further, an arrangement of the synchronizing mechanism comprising: a plurality of pins protruding from one end plane which is perpendicular to the second axial line of the cylinder block, and a plurality of recesses having a circular cross-sectional form provided to the inner plane of a cover which is the member of the casing which slidably comes into contact with both ends of the cylinder block, wherein the recesses have a radius which is equal to the sum of the offset between the first axial line and second axial line and the radius of the pins, and wherein these recesses are provided at positions corresponding with the pins to engage these pins, contributes to reduction in the number of parts since the synchronizing mechanism can be provided without adding special parts.

Further, an arrangement wherein the first and second pistons are provided with pressure pockets at the leading end planes thereof, and hydraulically communicated with the base planes constitute static pressure bearings at the sliding portion between the pistons and the inner circumferential face of the casing, thereby reducing the abrasion or seizure due to the sliding motion and extending life expectancy of the parts without increasing the number of parts.

Also, the first and second channels can be formed efficiently and connection with an external hydraulic circuit can be facilitated by the pair of first channels each having one end opening to portions opposing the eccentric member outer circumference and each having the other end opening to the tip plane of the shaft, and the pair of second channels each having one end opening to portions opposing the eccentric member outer circumference and each having the other end opening to the tip plane of the shaft.

What is claimed is:

1. A rotational hydraulic transformer, comprising:
   a first volume increasing/decreasing mechanism for cyclically and continuously increasing/decreasing the volume of a plurality of first spaces arrayed in a ring-like arrangement by shifting the phase of each, by means of employing relative positional change of two relative moving members;
   a second volume increasing/decreasing mechanism for cyclically and continuously increasing/decreasing the volume of a plurality of second spaces arrayed in a ring-like arrangement by shifting the phase of each, said second volume increasing/decreasing mechanism sharing said two relative moving members in common with said first volume increasing/decreasing mechanism and performing said increasing/decreasing by means of employing relative positional change of said two relative moving members;
   a pair of first channels, wherein one channel is connected to said first spaces of which the volume is increasing while the other channel is connected to said first spaces of which the volume is decreasing; and
   a pair of second channels, wherein one channel is connected to said second spaces of which the volume is increasing while the other channel is connected to said second spaces of which the volume is decreasing;
   wherein the increasing/decreasing volume of said first spaces in one cycle is made to be different from the increasing/decreasing volume of said second spaces in one cycle.

2. The rotational hydraulic transformer according to claim 1, wherein said first volume increasing/decreasing mechanism further comprises:
   a ring-shaped casing which is one of the relative moving members and which is rotatably supported as to a first axial line which is the center axial line thereof;
   a cylinder block which is the other relative moving member and which is rotatably supported as to a second axial line which is offset from said first axial line in a parallel manner;
   a synchronizing mechanism which synchronizes the rotational speed of said cylinder block and said casing so that the rotational speeds thereof are the same;
   a plurality of first cylinders of the same diameter formed in said cylinder block in a manner radial to said second axial line; and
   first pistons fitted into each of said first cylinders in a protruding and inserting manner with the leading end planes thereof coming into contact with the inner circumferential face of the casing, enabling cyclically and continuously increasing/decreasing the volume of spaces within said first cylinders which are said first spaces formed at the base side of said first pistons with rotation of said cylinder block, by shifting the phase of each;
   and wherein said second volume increasing/decreasing mechanism sharing said casing and cylinder block with said first volume increasing/decreasing mechanism, further comprises:
   a plurality of second cylinders of the same diameter formed in said cylinder block in a manner radial to said second axial line, so as not to overlap said first cylinders; and
   second pistons fitted into each of said second cylinders in a protruding and inserting manner with the leading end planes thereof coming into contact with the inner circumferential face of the casing, enabling cyclically and continuously increasing/decreasing the volume of spaces within said second cylinders which are said second spaces formed at the base side of said second pistons with rotation of said cylinder block, by shifting the phase of each.

3. The rotational hydraulic transformer according to claim 2, wherein an odd number of said first cylinders are evenly spaced upon a plane perpendicular to said second axial line, and wherein said second cylinders are spaced upon the same plane as the plane upon which the first cylinders are provided, in a manner symmetrical to the first cylinders.

4. The rotational hydraulic transformer according to claim 2, wherein the leading end planes of said first and second pistons are flat planes perpendicular to the direction of protruding and inserting, and wherein the inner circumferential face of said casing is comprised of a plurality of flat planes capable of slidably coming into tight contact with each of the leading end planes of these pistons.

5. The rotational hydraulic transformer according to claim 2, wherein said casing is axially supported by a shaft which is centered first axial line, and said cylinder block is axially supported by an eccentric member provided partway along said shaft and is centered upon said second axial line.

6. The rotational hydraulic transformer according to claim 2, wherein said synchronizing mechanism further comprises:

a plurality of pins protruding from one end plane which is perpendicular to the second axial line of said cylinder block, and a plurality of recesses having a circular cross-sectional form provided to the inner plane of a cover which is the member of said casing which slidably comes into contact with both ends of said cylinder block, wherein said recesses have a radius which is equal to the sum of said offset and the radius of said pins, and wherein these recesses are provided at positions corresponding with said pins to engage these pins.

7. The rotational hydraulic transformer according to claim 2, wherein said first and second pistons are provided with pressure pockets at the leading end planes thereof, which are hydraulically communicated with the base planes.

8. The rotational hydraulic transformer according to claim 5, wherein said pair of first channels each having one end opening to portions opposing said eccentric outer circumference and each having the other end opening to the tip plane of said shaft, and wherein said pair of second channels each having one end opening to portions opposing said eccentric outer circumference and each having the other end opening to the tip plane of said shaft.

\* \* \* \* \*

UNITED STATES PATENT AND TRADEMARK OFFICE
CERTIFICATE OF CORRECTION

PATENT NO. : 6,109,884
DATED : August 29, 2000
INVENTOR(S) : Yasuo Kita

It is certified that error appears in the above-identified patent and that said Letters Patent is hereby corrected as shown below:

<u>Column 14, claim 5,</u>
Line 62, after "centered" insert -- upon said --.

Signed and Sealed this

Second Day of October, 2001

*Attest:*

NICHOLAS P. GODICI
*Attesting Officer*     Acting Director of the United States Patent and Trademark Office